Dec. 18, 1956

M. J. HAPPE ET AL 2,774,246

INTERMITTENT DRIVE MECHANISM

Filed April 5, 1952

4 Sheets-Sheet 3

INVENTOR
MELVIN J. HAPPE
EDWIN B. NOLT

BY *Richard E. Babcock Jr.*

ATTORNEY

Dec. 18, 1956   M. J. HAPPE ET AL   2,774,246
INTERMITTENT DRIVE MECHANISM
Filed April 5, 1952   4 Sheets-Sheet 4
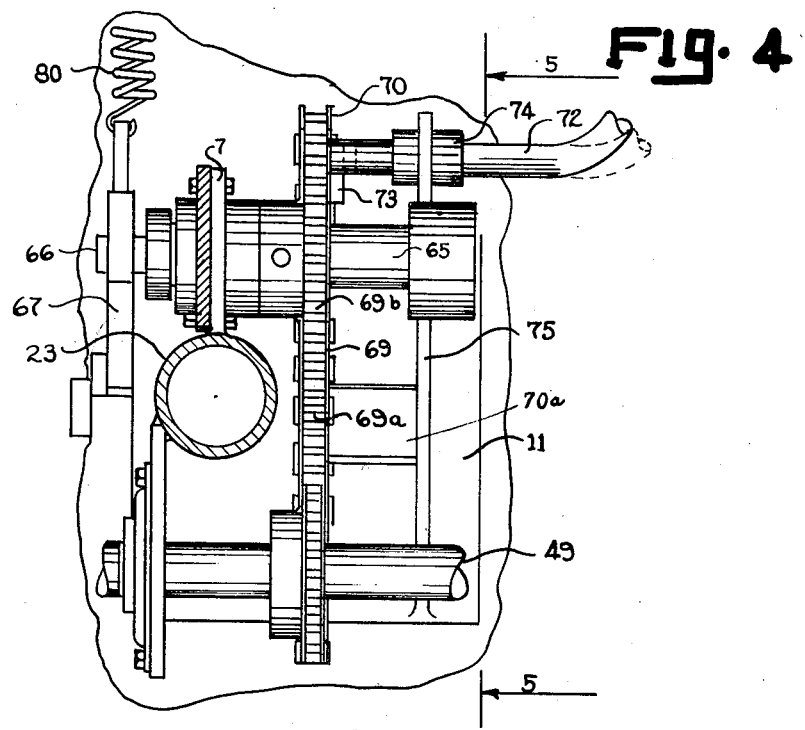
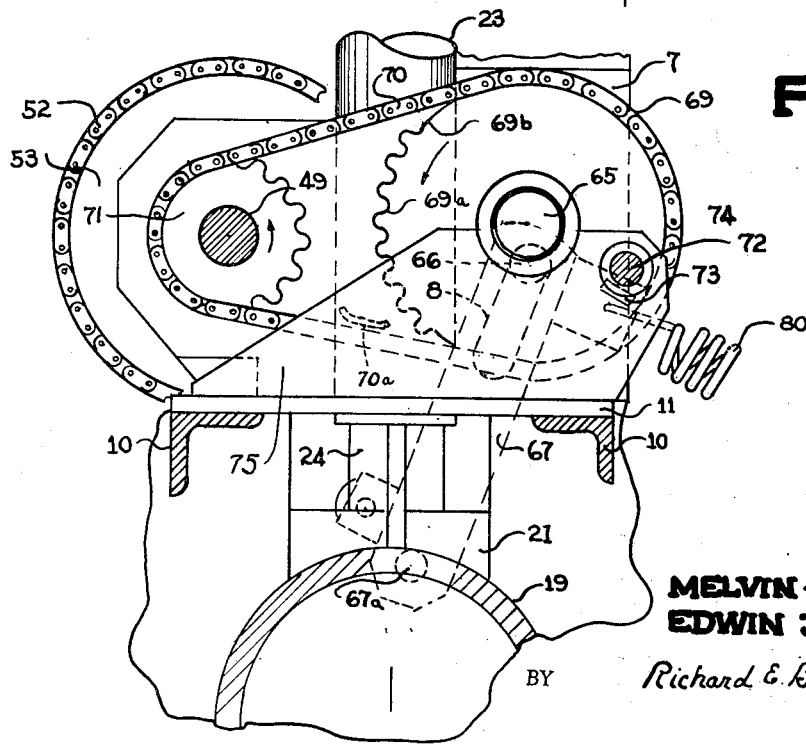
INVENTOR
MELVIN J. HAPPE
EDWIN B. NOLT
BY Richard E. Babcock Jr.
ATTORNEY United States Patent Office 2,774,246
Patented Dec. 18, 1956

2,774,246

INTERMITTENT DRIVE MECHANISM

Melvin J. Happe and Edwin B. Nolt, New Holland, Pa., assignors, by mesne assignments, to Sperry Rand Corporation, a corporation of Delaware Application April 5, 1952, Serial No. 280,751

7 Claims. (Cl. 74—84)

This invention relates to machines for treating hay by cracking or crushing the hay stems to accelerate drying of the hay as it is harvested.

Such machines customarily employ opposed crusher rolls between which the mowed hay is delivered by suitable pick-up mechanism as the machines are drawn over the ground.

From time to time during the operation of such machines, unusually large masses of hay or foreign objects will tend to accumulate in front of and clog the rolls due to inability to spread the rolls apart sufficiently to pass between them. In order to avoid such clogging it has been proposed to provide power actuated mechanism for separating the crusher rolls as required to permit passage of such objects or masses of material.

It is a primary object of the invention to provide a novel, simple and instantaneously actuable intermittent drive mechanism for such a machine, said mechanism having a sprocket normally restrained against rotation and having manually controllable means either to cause continued rotation of the sprocket or to cause a single rotation thereof.

Further objects are: to provide in such a mechanism a novel form of one revolution chain driven sprocket; and to provide, in conjunction with such a sprocket, resilient means for partially rotating the sprocket to cause positive driving engagement between the sprocket teeth and drive chain.

Other objects of this invention will be apparent hereinafter from the specification and from the recital in the appended claims.

Figure 1:
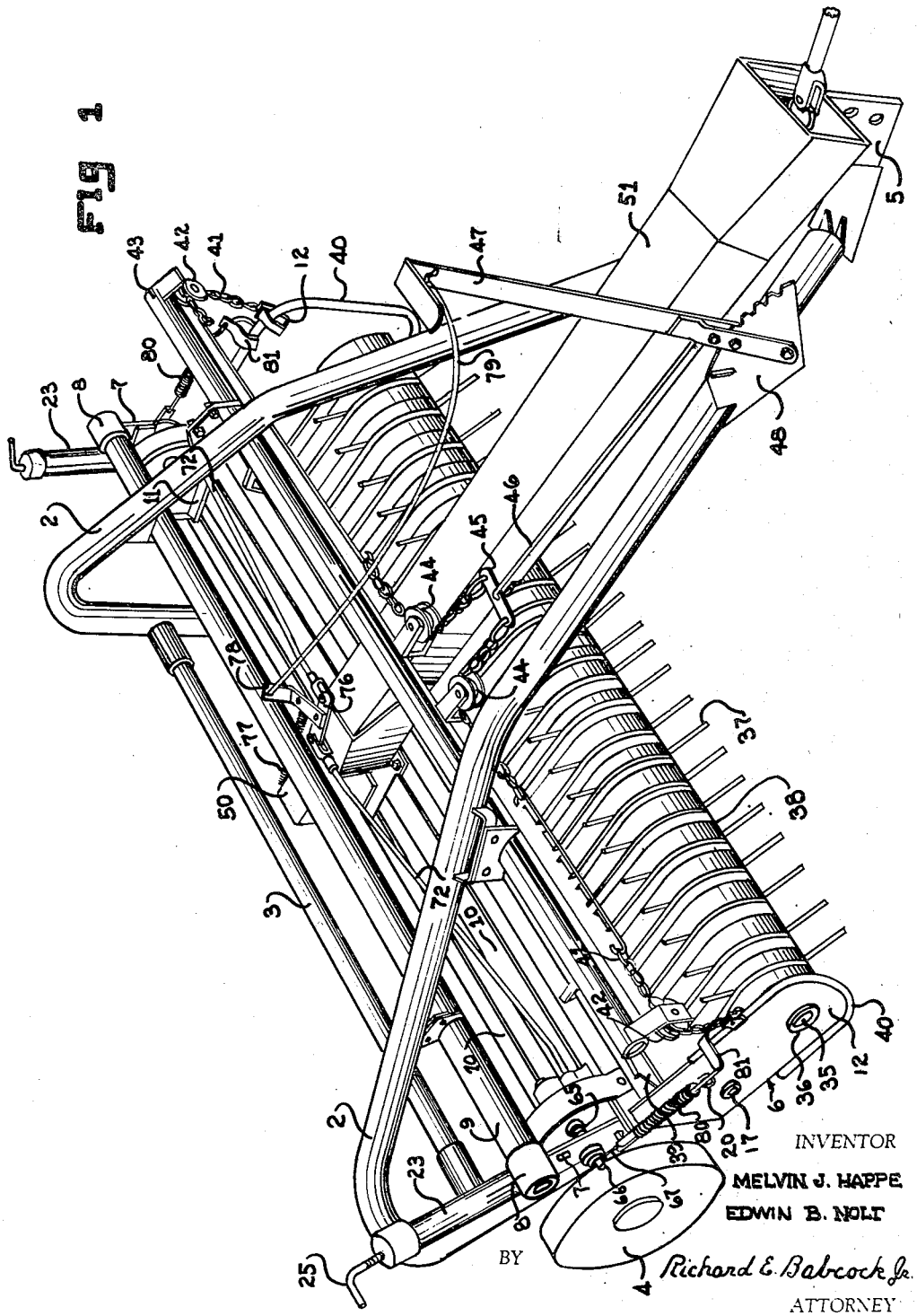
Figure 2:
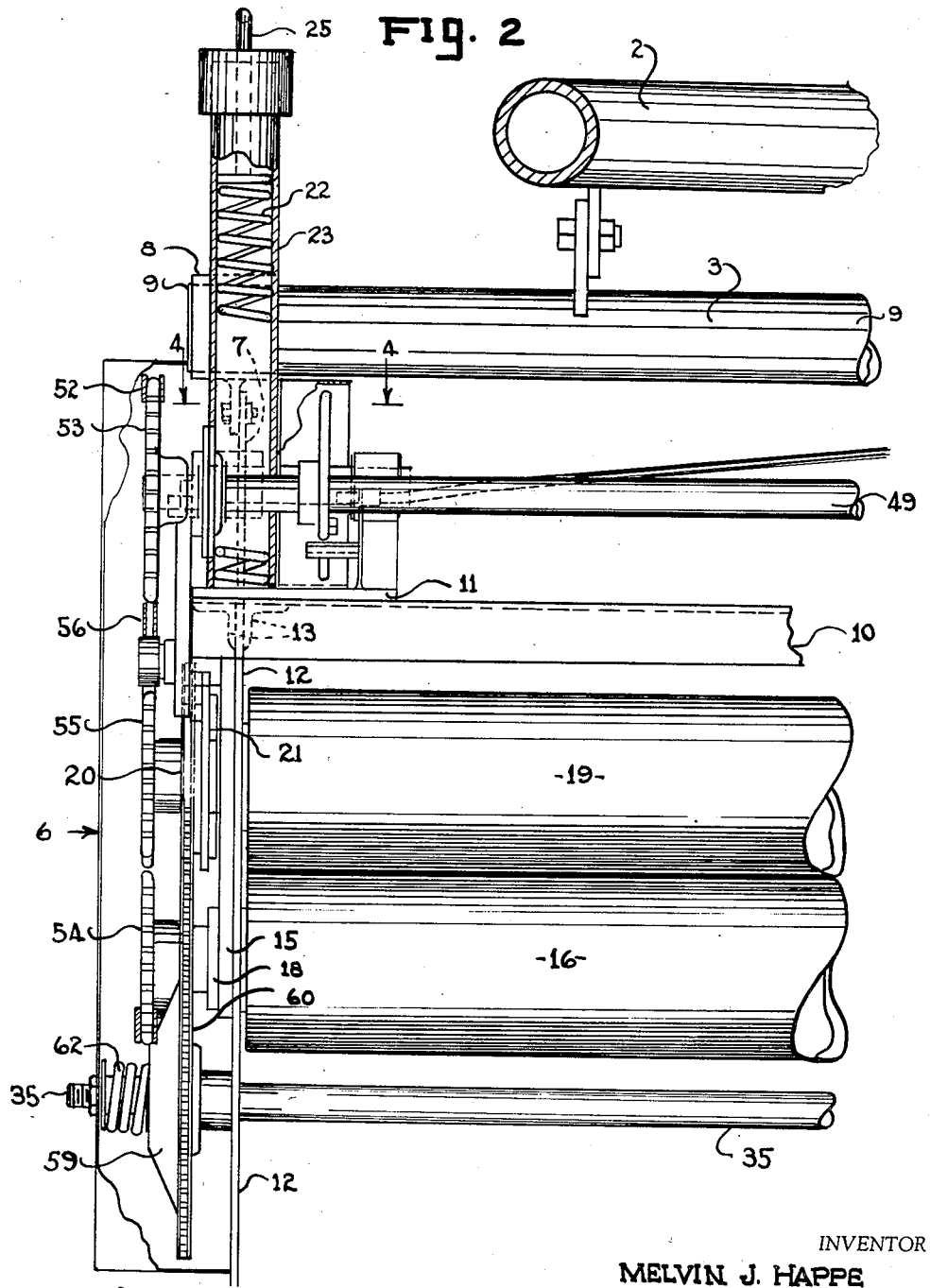
Figure 3:
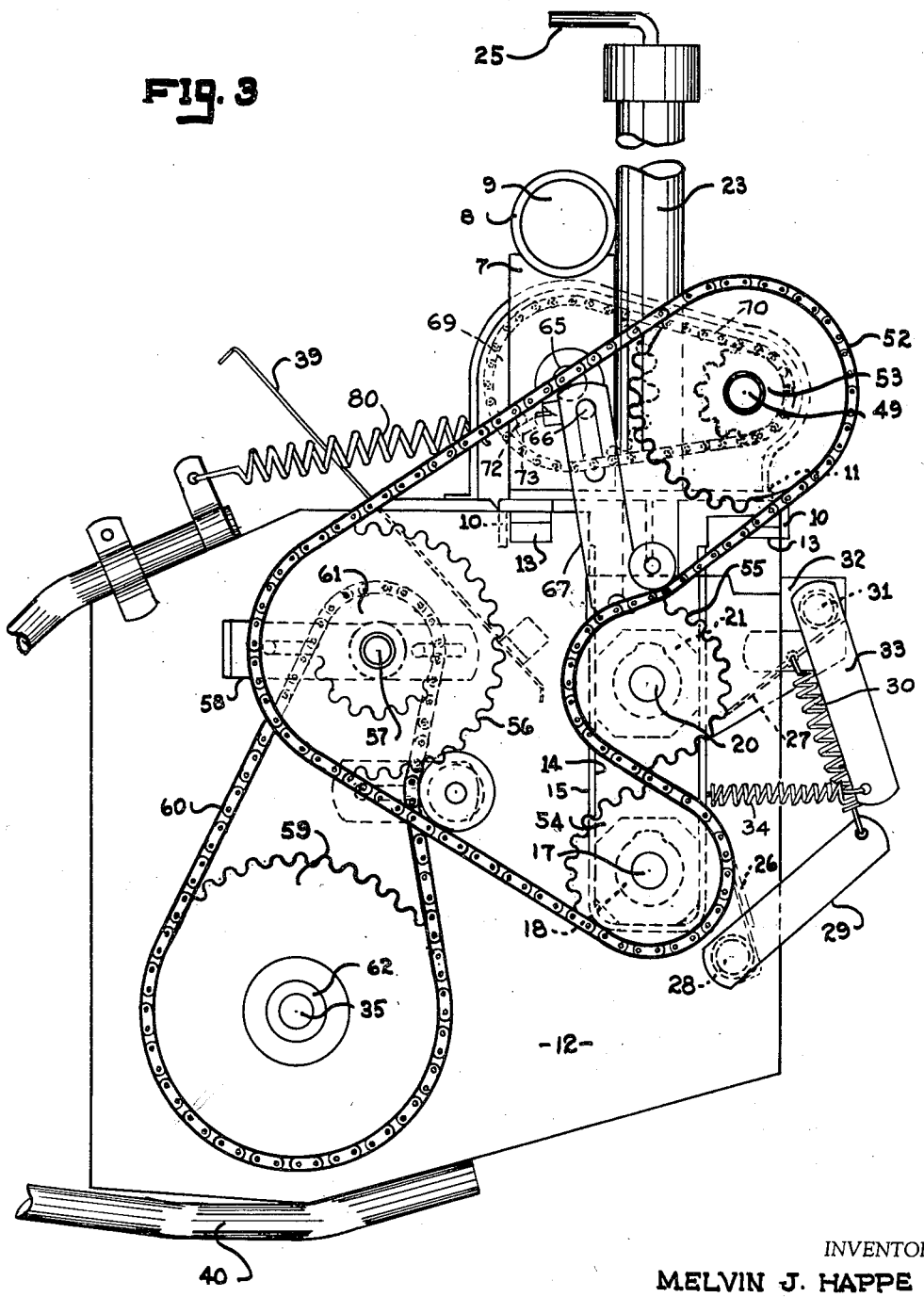

In the accompanying drawings:

Figure 1 is a perspective view of a hay crusher embodying the invention;

Figure 2, an enlarged rear view, partly in elevation and partly in section, showing end portions of the crusher rolls, and their associated driving mechanism;

Figure 3, an enlarged elevation of the drive mechanism for the rolls and pick-up mechanism, the guard or cover plate being removed;

Figure 4, a fragmentary section on the line 4—4 of Figure 2, looking in the direction of the arrows; and Figure 5, a fragmentary section on the line 5—5 of Figure 4, looking in the direction of the arrows.

Referring now in detail to the accompanying drawings, the hay crusher of the invention is supported for ground traversing movement by a rigid wheeled frame which comprises the rigid upwardly arched longitudinal frame members 2—2, connected at their rear ends by a transverse rigid member 3. Usual ground wheels 4—4 are rotatably supported at the depending rear ends of the longitudinal members 2—2 respectively. The downwardly inclined forwardly converging ends of these members are rigidly connected to a hitch or coupling element 5, whereby the front end of the frame may be operatively connected to and supported by the draw bar of a usual tractor or other draft device (not shown).

The crusher and pick-up mechanisms are preferably supported in the frame for adjustment relative to the ground level. One way of providing for such adjustment is exemplified in the accompanying drawings in which said mechanisms are carried in a cradle or auxiliary frame 6 which is swingably suspended from the main frame by hangers 7 having sleeves 8 rotatably journalled on a transverse round shaft 9 rigidly supported between the frame members 2 forwardly of the wheels.

Angle irons 10 extending transversely across this suspended frame 6 are connected at their ends to cross-tie plates 11 which in turn are welded to the hanger 7 respectively. Side plates 12 secured to the respective angle irons 10 by brackets 13 (Figures 2 and 3) are provided with transversely opposite vertical guide slots 14 which are preferably provided with marginal flanges 15 to function as tracks for the movable roller bearings.

The crusher mechanism of the invention comprises the lower crusher roll 16 supported for rotation on a horizontal shaft 17 journalled in bearings 18 which are fixedly positioned in the lower ends of the respective guide slots 14.

Cooperating with the lower roll 16 is an upper crusher roll 19 the shaft 20 of which is rotatably supported in bearings 21—21 which are guided for vertical movement in the slot 14 above said bearings 18—18.

Normally urging the upper roll 19 downwardly into engagement with the lower roll 16 are coil springs 22 under compression in tubular guides 23 secured to the respective hangers 7 and opening downwardly through the plates 11. The lower ends of the springs 22 abut against plunger portions 24 of the bearings 21 slidably received in the lower ends of the respective guides 23. In accordance with usual practice, the compression of the springs may be regulated by means of screws 25 threaded axially through the upper ends of the guides 23 and abutting against the springs 22.

To prevent material from adhering to and accumulating on the rollers 16 and 19, spring actuated scraper blades 26 and 27 may be operatively associated with the respective rolls.

The scraper blade 26 for the lower stationary roll 16 is fixed on a rock shift 28 which is rotatably supported by the side plates 12. A radial arm 29 fixed on this shaft 28 is loaded by a tension spring 30 extending from a bracket 32 on one of the upper roll bearings 21 (Figure 3) to maintain the blade 26 in spring pressed relation against its roll 16.

It is necessary that the upper scraper 27 move with its roll 19 in order to function properly. Accordingly as illustrated in Figure 3 the rock shaft 31 for the scraper 27 is rotatably supported rearwardly of the side plates 12 by brackets 32 carried by and constituting portions of the respective movable upper bearings 21. This shift 31 also has fixed thereto a radial arm 33 which is spring loaded as at 34 to maintain the scraper 27 in engagement with upper roll 19.

In order to lift hay from the ground and deliver it between the crushing rolls 16—19, a usual pick-up mechanism is mounted in the swingably suspended cradle 6 in advance of the crusher rolls 16—19.

The pick-up mechanism, which may be of any conventional type, is exemplified by a rotary pick-up reel having its shaft 35 journalled in bearings 36 carried by the respective side plates 12. Tines or arms 37 carried by the reel, rotate between stripper elements 38, the rear ends of which are disposed to deliver hay into the throat between the rolls 16—19. The pick-up mechanism cooperates with the rolls substantially in the manner disclosed in the Reed U. S. Patent 2,345,715, of April 4, 1944.

Cooperating with the reel tines 37 and stripper plates 38 to direct material between the rolls 16 and 19, is a guide plate or hold down 39 (Figure 1) supported between the side plates 12 above the pick-up. This guide plate 39 slants downwardly rearwardly toward the throat between the rolls, and, with the stripper plates 38, functions as a chute directing the hay between the rolls.

Tubular runners 40 carried by the respective side plates are disposed to engage any protuberances or rough spots in the ground to thus raise the pick-up mechanism so that it will ride over irregular terrain without damage. Preferably the tubular runners 40 extend for substantial distances up and around the forward edges of their respective side plates 12 to stiffen and reinforce these plates.

In addition, it is desirable to provide means for adjusting the operating height of the pick-up means to varying levels as dictated by varying conditions, as well as for raising the pick-up mechanism to inoperative position for transportation to and from the field.

Such means may comprise flexible tension elements 41 anchored to the respective runners 40—40 these being guided over pulleys 42—42 supported on a cross frame member 43, and thence around pulleys 44 connected through a cross head 45 and rod 46 to a usual control lever 47 mounted for pivotal adjustment on one of the longitudinal frame members 2, and cooperating in usual manner with a fixed quadrant plate 48.

Power for rotating the crusher rolls 16 and 19 and the shaft 35 of the pick-up reel may be supplied from the power take-off of the tractor which tows the hay crusher, through obviously the power for this purpose may be supplied by other conventional means.

Such power is transmitted to a main drive shaft 49 journalled across the cradle, through a gear box 50 and power transmission shafts extending from the tractor power take-off to the gear box through a housing 51.

As shown in Figure 3, a sprocket chain 52 disposed around a sprocket 53 keyed on the drive shaft 49 is passed around roll drive sprockets 54 and 55 fixed on the respective roll shafts 16 and 19. Chain 52 also is passed around an idler sprocket 56 on stub shaft 57 which is supported for linear adjustment on a slide or plate 58 to take up slack occurring in the chain 52. Adjustment of the slide 58 may be obtained in any conventional manner.

It will be noted that the chain 52 is disposed over the forward peripheral portion of the movable upper roll sprocket 55, then rearwardly between the sprockets 55, 54 and downwardly around the rear and bottom peripheral portion of the sprocket 54, to cause rotation of the sprockets and their respective rolls 19 and 16 in opposite directions. Such disposition of the chain 52 also will permit vertical movement of the sprocket 55 with the movable upper roll without disrupting the drive connection between chain 52 and the several sprockets 53, 54, 55 and 56, since such movement will merely displace the loop of chain around sprocket 55 without appreciably tightening or slacking the chain.

The reel drive shaft 35 is driven through a sprocket 59 by means of a chain 60 passing around said sprocket 59 and also around a sprocket 61 keyed on the idler shaft 57. Preferably the sprocket 59 is rotatably disposed on the reel shaft 35 and is urged by a spring 62 into frictional engagement with a clutch member 63 keyed on the shaft. Thus the sprocket 59 may comprise the driving member of a slip clutch assembly.

In the absence of suitable preventative means, the crusher rolls 16—19 may at times tend to become clogged, either by the accumulation of large masses of plant material in front of the rolls which is unable to spread the rolls sufficiently to enter therebetween, or by the obstruction of foreign objects too large to normally pass between the rolls. It has heretofore been proposed to remedy this condition by providing manually controllable power actuated mechanism for spreading apart the rolls in order to permit the passage between them of such masses of material or foreign objects.

The invention comprises a novel power roll separating mechanism which is manually controllable to cause either a single or repeated raisings and lowerings of the upper crusher roll, to permit such large masses of material or foreign objects to pass between the rolls without clogging.

The roll spreading means of the invention includes identical duplicate mechanisms, each associated with one of the vertically movable bearings 21 supporting the opposite ends of the upper roll shaft 20. This being the case, it will suffice to describe but one of said mechanisms in detail.

Referring now to Figures 3, 4 and 5 of the drawings, each such roll spreading mechanism comprises a stub shaft 65 journalled through the side plate hanger 7 above the vertically movable roll bearing 19 at its respective side of the machine. A crank pin 66 fixed on the outer end of the shaft is operatively connected through a link 67 as at 67a (Figure 5) to the bracket 32 of slidable bearing 21 to vertically raise the latter responsive to rotary movement of the shaft 65. It is desirable to permit the roll to maintain raised or separated from lower roll as the shaft 65 completes its rotation, in order to permit the mass of material or foreign object to uninterruptedly continue its passage between the rolls. To this end, the link 67 is provided with a longitudinal slot 68 which slidably receives crank pin 66. The arrangement is such that the pin normally rests against the upper end of the slot 68 so that the bearing commences its upward displacement (against the resilient action of spring 22) simultaneously with the inception of the rotary movement of the shaft 65 and crank pin 66. However, even though the bearing 21 remains raised after the crank 66 has rotated through 180° and commenced the return half of its revolution, the slot 68 will permit a lost motion between the link 67 and bearing 21 sufficient to permit return of the crank 66 to its starting point without exerting a downward force on the bearing 21.

Rotary movement is imparted to the stub shaft 65 and crank 66 by means of an incomplete or mutilated sprocket wheel 69 keyed on said shaft and driven by a usual sprocket chain 70 from a drive sprocket 71 which, in the present instance, is keyed on the main drive shaft 49 of the machine.

Sprocket wheel 69 is provided with sprocket teeth 69a around a portion only of its periphery, the remaining portion thereof comprising a smooth arcuate periphery as at 69b. Latch means 72 in engagement with an axial abutment or rib 73 on the side face of the wheel 69 normally maintains the wheel in fixed position, with the sprocket chain 70 freely slidably disposed around and engaging only the smooth or untoothed portion of its periphery. In this position of the sprocket wheel 69 the crank 66 is at substantially its closest point of approach to the lower roll shaft 17 so that the springs 22 may normally maintain the rolls in engagement.

The latch 72 may comprise a rod slidable longitudinally through a stationary guide element 74 (carried by vertical support plate 75 on the frame plate 11) and out of the path of rotation of the rib 73 on the sprocket wheel 69.

In order that the roll separating mechanisms associated with each of the vertically displaceable bearings 21—21 may be simultaneously actuated and controlled, it is desirable that both latch rods 72 be connected to a common control member housing 51, its opposite ends being pivotally connected with the latch rods 72 respectively, as shown in Figure 1.

Normally suitable spring means 77 urges the lever in a direction to project both rods 72 into operative latching engagement with the latching ribs or abutments 73 of their respective wheels.

The rods 72 may be retracted from such latching engagement by rotary movement of the lever 76 in a clockwise direction as viewed in Figure 1. Simply by way of illustrating one manner of so moving the lever 76 I have shown same as provided with a rigid arm 78 disposed eccentrically to the fulcrum of the lever. Connected to the arm and extending forwardly therefrom is a control cord 79 which may be pulled to swing the lever 78 and thereby retract the latch rods from their operative latching positions. The forward end of this cord 79 may be positioned at any location where it may be easily grasped and pulled by the tractor operator, as for instance by being tied to the adjusting lever 47.

While the frictional engagement of the drive chains 70 on the smooth peripheries of the sprocket wheels 69 may be relied upon to rotate the toothed portions of the wheels into mesh with chains 70, as required to initiate the roll separating action, it has been found in practice that such frictional engagement alone often results in an undesirable lag between tripping of the latch means and actual initiation of the roll separating operation, and further does not necessarily result in the opposite ends of the upper roll 19 being raised and lowered simultaneously.

Accordingly it is found preferable to provide resilient means, such as the springs 80 operative immediately upon the release of the latch mechanism for partially rotating the respective wheels 69 whereby the sprocket toothed portions 69a of the two wheels may be simultaneously meshed with their respective sprocket chains 70.

Each such spring 80 is disposed under tension between the upper end of the connecting link 67 and a fixed bracket 81 on one of the runners 40 of the cradle. It will be seen that the forward pull exerted by each spring 80 on its respective link 67 is transmitted through the crank 66 to its associated stub shaft 65 and sprocket wheel 69 to cause a limited rotary movement of the latter in the desired direction immediately upon release of the latching means.

The springs 80 serve the additional function of providing a resilient floating support or counterbalancing means for the cradle 6 about its pivotal suspension 8.

In the operation of the invention, as the machine is towed along over the previously mowed hay, the pick-up fingers 37 will lift the hay from the ground and direct it between the crusher rolls 16—19. The rolls 16—19 will tend to crush or crack the stems of hay passing therebetween and then discharge the hay rearwardly onto the ground. As is well known, such treatment will facilitate the rapid curing of the hay, which may then be baled with a minimum loss of time in the overall operation.

Where large masses of hay or other objects tend to pile up in front of the crusher rolls, a pull on the control cord 79 will release the latching mechanism 72, thus initiating the power separation of the rolls 16—19 against the pressure of springs 22 in the manner above described.

On most occasions it is desirable to separate the rolls 16—19 only for sufficient time to permit the accumulated mass of hay or the like to enter between the rolls, whereupon the material will normally maintain the rolls separated sufficiently to complete its passage therebetween. This may be accomplished simply by a rapid jerk on the control cord, releasing the latch rods 72 only sufficiently to permit the ribs 73 to clear same. The spring 77 acting through arm 78 and lever 76 will return the rods to latching position before the sprocket wheels have completed a revolution. Thus the latch rods 72 may serve to permit only a single revolution of the sprocket wheels 69.

It will be seen that the baffle 70a, mounted on the plate 75 above the lower run of chain 70, will prevent accidental engagement of the chain 70 and sprocket teeth 69a.

If desired however, the control cord 79 may be maintained under constant tension for as long as desired to cause a repeated raising and lowering of the upper crusher roll 19.

In this application there is shown and described only the preferred embodiment of the invention, as by law required. However, it is recognized that the invention is capable of other and different embodiments, and that the several details thereof may be modified in various ways, all without departing from the invention. Accordingly, the accompanying drawings and description are to be construed as merely illustrative in nature, and not as excluding other forms or modifications of the invention.

Having thus described the invention, we claim:

1. Crusher roll release mechanism for a hay crusher comprising, a rotatably mounted shaft, a power drive mechanism including a drive chain, an incomplete sprocket wheel rotatable with said shaft, a portion of the periphery of said wheel being smooth and free of sprocket teeth, said drive chain being slidable disposed around said smooth portion of the wheel, releasable latch mechanism normally restraining said wheel against movement with said chain.

2. Crusher roll release mechanism for a hay crusher comprising, a rotatably mounted shaft, a power drive mechanism including a drive chain, an incomplete sprocket wheel rotatable with said shaft, a portion of the periphery of said wheel being smooth and free of sprocket teeth, said drive chain being operatively disposed around said smooth portion of the wheel, releasable latch mechanism normally restraining said wheel against movement with said chain, and resilient means operative upon release of said latch mechanism for rotating the toothed portion of said wheel into driven engagement with said chain.

3. Crusher roll release mechanism for a hay crusher comprising, a rotatably mounted shaft, a power drive mechanism including a drive chain, an incomplete sprocket wheel rotatable with said shaft, a portion of the periphery of said wheel being smooth and free of sprocket teeth, said drive chain being slidably disposed around said smooth portion of the wheel, releasable latch mechanism normally restraining said wheel against movement with said chain, the frictional engagement of said chain on said wheel tending to rotate the toothed portion of the wheel into mesh with said drive chain upon release of said latch mechanism.

4. Crusher roll release mechanism for a hay crusher comprising, a power drive mechanism including a drive chain, an incomplete sprocket wheel and means rotatably supporting same, a portion of the periphery of said wheel being smooth and free of sprocket teeth, said drive chain being slidably disposed around said smooth portion of the wheel, releasable latch mechanism normally restraining said wheel against movement with said chain, and resilient means operative upon release of said latch mechanism for rotating the toothed portion of said wheel into mesh with said drive chain.

5. Mechanism comprising, a drive element, a rotatably mounted shaft, a drive wheel rotatable with said shaft, an operative portion of the periphery of said wheel being adapted for driven engagement with said drive element and an inoperative portion of said periphery being formed to slidably engage said drive element, releasable latch mechanism normally restraining said wheel against movement with said drive element when the latter engages said inoperative portion of the wheel periphery, such slidable engagement being operative upon release of said latch mechanism for rotating the operative portion of said wheel into engagement with said drive element.

6. Intermittent drive mechanism comprising a rotatably mounted shaft, a power drive mechanism including a drive chain, an incomplete sprocket wheel rotatable with said shaft, a portion of the periphery of said wheel being smooth and free of sprocket teeth, said drive chain being slidably disposed around said smooth portion of the wheel, releasable latch mechanim normally restraining said wheel against movement with the chain, crank means fixed to said shaft, and means resiliently biasing said crank means to rotate the toothed portion of said wheel into driven engagement with said chain upon release of said latch mechanism.

7. Intermittent drive mechanism comprising a drive chain, an incomplete sprocket wheel and means rotatably supporting same, a portion of the periphery of said wheel being smooth and free of sprocket teeth, said drive chain being slidably disposed around said smooth portion of the wheel, releasable latch mechanism normally restraining said wheel against movement with the chain, crank means fixedly associated with said wheel, and means resiliently biasing said crank means to rotate the toothed portion of said wheel into engagement with said chain upon release of said latch mechanism.

References Cited in the file of this patent

UNITED STATES PATENTS

| | | |
|---|---|---|
| 707,917 | Goodwyn | Aug. 26, 1902 |
| 846,690 | Newman | Mar. 12, 1907 |
| 1,020,309 | Polnisch | Mar. 12, 1912 |
| 1,590,246 | Korsmo | June 29, 1926 |
| 1,804,143 | Birdsall | May 5, 1931 |
| 2,345,715 | Reed | Apr. 4, 1944 |
| 2,378,764 | Frick | June 19, 1945 |
| 2,553,521 | Reitberger | May 15, 1951 |
| 2,621,778 | Heinji | Dec. 16, 1952 |